(12) United States Patent
Roncal (10) Patent No.: US 7,936,484 B2
(45) Date of Patent: May 3, 2011

(54) INTERNET-BASED SYNCHRONIZED IMAGING

(76) Inventor: Ronald Gabriel Roncal, Burlingame, CA (US)

(*) Notice: Subject to any disclaimer, the term of this patent is extended or adjusted under 35 U.S.C. 154(b) by 0 days.

(21) Appl. No.: 11/810,169

(22) Filed: Jun. 5, 2007

(65) Prior Publication Data

US 2007/0291323 A1  Dec. 20, 2007

Related U.S. Application Data

(60) Provisional application No. 60/813,580, filed on Jun. 14, 2006, provisional application No. 60/879,225, filed on Jan. 6, 2007, provisional application No. 60/906,418, filed on Mar. 12, 2007.

(51) Int. Cl.
*H04N 1/00* (2006.01)

(52) U.S. Cl. ....... 358/402; 358/452; 358/448; 358/1.18; 348/231.5; 348/231.6; 348/208.1; 348/333.02; 348/231.3

(58) Field of Classification Search ............... 348/207.1, 348/231.4, 239, 333.02, 231.5, 231.6, 208.1, 348/231.3; 358/452, 537, 448, 1.15, 402, 358/1.18
See application file for complete search history.

(56) References Cited

U.S. PATENT DOCUMENTS

| | | | |
|---|---|---|---|
| 5,459,819 A * | 10/1995 | Watkins et al. | 358/1.18 |
| 5,633,678 A * | 5/1997 | Parulski et al. | 348/231.5 |
| 6,122,526 A | 9/2000 | Parulski et al. | |
| 6,483,540 B1 * | 11/2002 | Akasawa et al. | 348/239 |
| 6,573,927 B2 * | 6/2003 | Parulski et al. | 348/32 |
| 6,597,392 B1 * | 7/2003 | Jenkins et al. | 348/207.1 |
| 6,657,658 B2 * | 12/2003 | Takemura | 348/207.99 |
| 6,915,273 B1 | 7/2005 | Parulski | |
| 6,959,508 B2 | 11/2005 | Watkins et al. | |
| 6,970,199 B2 | 11/2005 | Venturino et al. | |
| 6,970,606 B2 | 11/2005 | Lee | |
| 6,972,859 B1 | 12/2005 | Patton et al. | |
| 6,999,111 B2 | 2/2006 | McIntyre | |

(Continued)

FOREIGN PATENT DOCUMENTS

WO  WO 2006/064933  * 12/2005

OTHER PUBLICATIONS

JP2003-157326 English Translation.*

*Primary Examiner* — Twyler L Haskins
*Assistant Examiner* — Dennis Dicker
(74) *Attorney, Agent, or Firm* — Lawrence Edelman; The Law Office of Lawrence Edelman (57) ABSTRACT

A internet based method and apparatus is described for automatically processing a captured digital image taken by a smart device at a fixed-location, mobile or virtual event, and synchronizing the combination of that captured primary image with a secondary image, be it a picture frame, or a watermark to create a combined media image. If desired, the combined image may also contain an audio file. Once combined, the image may be stored for later viewing, and/or automatically returned to the user of the smart device or the PC of the user who captured the primary image, forwarded to an online print service website, posted to a photo sharing website, and/or forwarded to a distribution list. The automated post processing of said captured images is handled by a process engine hosted at an Application Provider's website, the process engine containing instructions for the media combining and metadata tagging of said images.

13 Claims, 5 Drawing Sheets

U.S. PATENT DOCUMENTS

| | | |
|---|---|---|
| 7,000,192 B2 | 2/2006 | Allen et al. |
| 7,007,243 B2 | 2/2006 | Baldino |
| 7,009,556 B2 | 3/2006 | Stewart |
| 7,009,643 B2 * | 3/2006 | Nakamura et al. ......... 348/231.4 |
| 7,015,957 B2 | 3/2006 | Romano et al. |
| 7,024,054 B2 | 4/2006 | Chahill et al. |
| 7,034,880 B1 | 4/2006 | Endsley et al. |
| 7,043,157 B2 | 5/2006 | McIntyre et al. |
| 7,092,966 B2 | 8/2006 | McIntyre |
| 7,098,931 B2 | 8/2006 | Patterson et al. |
| 7,190,370 B1 | 3/2007 | Haeberli |
| 7,403,225 B2 * | 7/2008 | Singh ......................... 348/231.5 |
| 2002/0019978 A1 * | 2/2002 | Terretta ............................ 725/34 |
| 2002/0135680 A1 * | 9/2002 | Haruki ....................... 348/207.2 |
| 2002/0186402 A1 | 12/2002 | Jackson et al. |
| 2004/0161163 A1 * | 8/2004 | Takamidoh ................... 382/275 |
| 2004/0250205 A1 * | 12/2004 | Conning ....................... 715/517 |
| 2005/0219384 A1 * | 10/2005 | Herberger et al. ............ 348/239 |
| 2006/0087686 A1 * | 4/2006 | Anderson et al. ............ 358/1.15 |
| 2008/0266322 A1 * | 10/2008 | Isomura ....................... 345/629 |

* cited by examiner

INTERNET-BASED SYNCHRONIZED IMAGING

This utility patent application incorporates by reference and claims priority to my earlier Provisional Patent Application Ser. No. 60/813,580, filed Jun. 14, 2006, entitled Location Based Internet Synchronized Imaging, Provisional Patent Application Ser. No. 60/879,225, filed Jan. 6, 2007, entitled Location Based Internet Synchronized Imaging and Provisional Patent Application Ser. No. 60/906,418, filed Mar. 12, 2007, entitled Dynamic Digital Media Frames.

FIELD OF INVENTION

This invention relates to both a method and apparatus for enabling internet based synchronized imaging of photographed objects and events from fixed, mobile and/or virtual locations at the point of capture, and the automated tagging, storage and forwarding of these captured images.

BACKGROUND OF THE INVENTION

Today, individuals can utilize numerous methods for recording digital images of photographed subjects, be they still or video. Consumers can capture these images with digital cameras, cell phone cameras, Personal Digital Assistants (PDAs) and/or other smart devices. Such devices have the ability of storing these images for later access, and further support the ability to disseminate them via the internet.

Currently such captured images must be uploaded to a physical "service station" like those typically found at a retail outlet, or to a personal computer in order to access an on-line service for the purpose of buying digital photographic prints. The service station process requires that the consumer use compatible media for input: e.g. a memory card such as a flash stick, or a diskette, which can be inserted into a computing device, read, and then processed by the CPU to initiate the imaging production process. Similarly, a consumer can attach the recording device by cable through an input port to a personal computer, download and then print the image using either a personal printer or an online service. A consumer can also use low range Bluetooth technology to beam an image to a device in close proximity of their camera or smart device. However, nowhere among these existing process are consumers able to synchronize a captured image to a user-specific account established with an applications provider, where post capture processing is automated according to the subscriber's preferences, such post capture processing including the automated combing of the captured image with a frame, a watermark and/or an audio file.

SUMMARY OF THE INVENTION

The methods of this invention provides for synchronizing the imaging of these files from the consumer's location or point of capture across multiple communication channels including and utilizing wireless communications. Unlike the process of uploading images to an existing account with a service provider for the access, modification and/or output of captured images from a personal computer, these transactions (MEDIA image uploads) can be synchronized with complimentary business commerce and consumer service processes. Synchronization, handled by a process engine (as later described), includes sub-processes for account creation, image archiving, image processing, and the like. These processes can be user defined and managed through the use of a smart device or via a personal computer or web client interface hosted or executed through an internet connection. For example, a consumer may select to process all images from a given cell phone to a predefined image repository "album". These image types may be suitable only for smaller print formats and the pre-selection of the output type (also managed by the process engine) enables the consumer to automate the ordering of prints from a pre-selected source.

In one embodiment, an internet imaging applications provider, sponsored event or location based promoter, etc., through partnership with a telecommunications service can provide a telephone number for uploading digital images as part of a themed promotion. This process automation is one of several capabilities of the synchronization method. The provider/promoter can combine an uploaded primary subject image taken by a user/consumer with a secondary image, the secondary image in one embodiment comprising a "picture frame", that is, an external border surrounding the primary image. Text or graphics can be incorporated into this border. Alternatively, or in addition thereto, a watermark (that is, a translucent-like overlay onto the captured image) can be added to the uploaded image, to mark or imprint the image with graphics or text.

These dynamic rich media frames may contain multi-media components which can be dynamically associated to an inbound message or request based upon information associated with the inbound request. As an example, the processed media file may contain both a still image and an audio snippet so that when opened the sound is heard while the user views the downloaded image. In another embodiment, the inbound message or request may be specific to a given event location and therefore dynamically access the appropriate downloadable media. As an example, one may connect to a service linked with a professional sports stadium by using a unique telephone number, email address or the like. This number or identifier is associated to an appropriately themed media and this media is dynamically associated by the process engine to the inbound request and returned to the requestor's portable smart device to frame the stored digital image.

In another embodiment of the invention, the consumer can access and download dynamic rich media frames to their portable smart device to automatically frame device stored digital images.

These provided frames adhere to the standard aspect ratios of the digital media so that the frames can be applied to all standards based portable smart devices. They can also be modified to fit customized dimensions. The frames are available in numerous color schemes and designs as well as sponsored graphics. These frames can incorporate areas for graphics or describe a themed or sponsored event or location.

These frames also accept embedded data descriptions based upon user provided data entry. This frame based metadata is incorporated into the frame and media file transmission. As an example, a user can access the application and update a metadata tag form and specify descriptions for the images he plans to capture or that he has captured. Additionally, this application will allow a user to integrate metadata tags from the wireless network and transmit these with his frame metadata preferences, device metadata, as well as the image file metadata to a given destination or service for processing. In this way, the consumer can store the thus processed images in his smart device, have them reside at a remote server, send them to a service provider for printing, or forward the processed images through the www to a designated computer or internet connected display device such as a television.

The process engine manages numerous processes and sub-processes, including media and transaction messaging across the system's topology. The process engine is triggered into action upon receipt of a transaction forwarded from the consumer' wireless device via a wireless network. This transaction manifests itself in the form of the consumer first photographing a subject, and having the device store the photographed image as a digital image file. The thus captured primary image is then uploaded to the destination site using a wireless (i.e. smart) device as described above. The upload image transaction includes metadata which may specify among other things the sender and the location or event where the image was captured. This information is investigated by the processing engine and then compared to data associations resident in a global event management database. Based upon a determined correlation, the engine further processes the image, including possible framing and/or media tagging. The image can then be saved to the consumer's account at a destination site. The compiled image or media is then available for the consumer to view, share or publish.

This synchronization process is initiated by the consumer through his device, to which a program has been downloaded (pre or post market) to the phone, or smart device, with the necessary resident software for directly connecting to an internet destination. The consumer merely selects a command (e.g. "Synch") and based upon the device profile and the consumer's selected preferences, the images are synchronized at the designated destination. Transmitted by wireless or by telephony (cellular) network, information gathered from the network during the transmission process attaches to and becomes associated with the image transmission in the form of metadata. This metadata informs and initiates the process engine to fulfill the imaging process which may include the execution of fixed location based or mobile based image framing/watermarking and media tagging, or an electronic commerce transaction, or both.

In the case where an online service is utilized, synchronization can also enable an "e-commerce transaction" dialog initiated between the consumer and a selected service provider. Thus, a service provider can initiate a promotional incentive for each of the synchronized transactions through multiple channels such as email, regular mail or personalized offers via an internet portal. More specific examples of business methods utilizing this technology are further described below in the Detailed Description of the Invention.

BRIEF DESCRIPTION OF THE DRAWINGS

So that the above-recited features of the present invention can be understood in detail, a more particular description of the invention, briefly summarized above, may be had by reference to various embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF THE INVENTION

Figure 1:
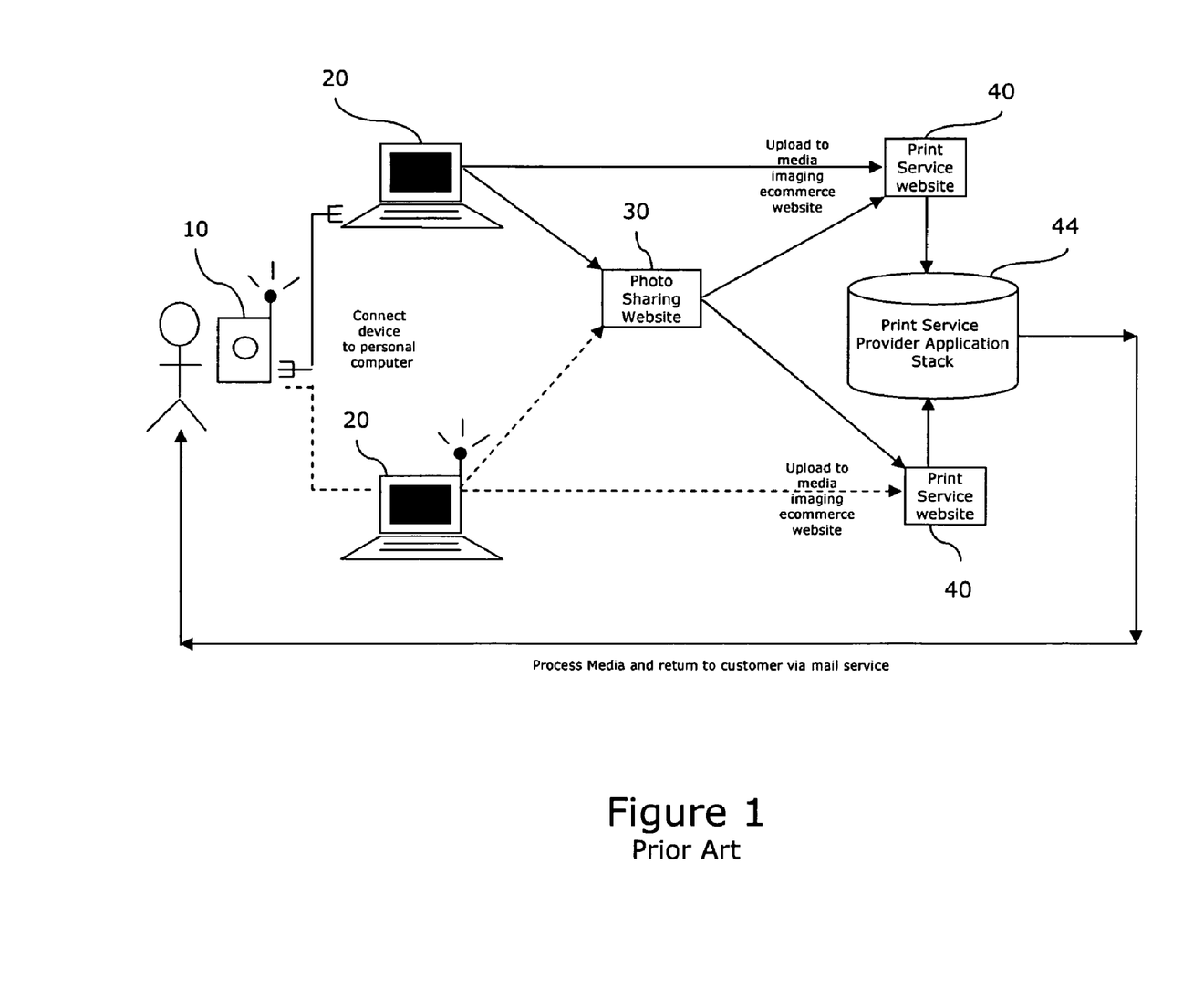
FIG. 1 is a system level view depicting traditional means for capturing and processing of images via the internet.

Today, digital imaging devices can photograph, digitally capture and upload digital renditions of photographed images either wirelessly, through the use of cables, memory sticks or other related media. This process is well known and many instances of this capability exist in the marketplace. Illustrating this process in FIG. 1, a consumer capturing an image using a smart device 10 as defined below must first connect to a computer 20 to download the captured image. The image is then transmitted via cable, DSL, or wireless network to be uploaded to a print service provider website 40, where a print order can be processed via the print service provider's server 44, and returned through post mail to the consumer. Alternatively, the image can be transmitted to a photo sharing website 30 where uploaded photographic images can be posted to a photo album, for later viewing by those having access to the album. From this website, the images can also be forwarded to print service site 40. A current example of the former is Snap Fish, sponsored by Hewlett Packard, and of the latter are Shutterfly, and Kodak.

The present invention compliments this capability by enabling synchronization through the use of wireless communications. As used herein, synchronization is used to denote a process where an image is automatically processed to combine it with a secondary image and tagged, and when sent to an application provider's (i.e., image synchronization) site is automatically linked to a user specific account where the image is thereafter processed according to pre-selected preferences/instructions associated with the account. Specifically, the invention enables the synchronization of input devices (e.g., a cell phone camera, digital camera (be it point and shoot or digital SLR), smart device, digital video, kiosk, etc), and other multi media devices to a service or an output device (online service, internet destination, kiosk, service station, etc) and the processing of media through the use of wireless telecommunication networks when and where applicable.

For example, a consumer can access a broadband wireless network, WiFi, WiMax and the like while roaming through a network hotspot or grid. The consumer can dial a pre-defined telephone number when a network hotspot is not available or preferred or his device may utilize his system's cellular network coverage to transmit the media for online processing. To this end, it is anticipated that cell phones and digital cameras (exemplified by Kodak's recently released Easy Share V610 digital camera, with embedded Bluetooth wireless technology) will continue to converge in such a way that both types of devices will be "internet enabled".

In one embodiment of the invention an embedded program is provided for use by any of these digital imaging products. In the case of both the cell phone camera and the digital camera, an embedded program is provided to support one-button synchronization as described above to a predefined destination The specification of these destinations can be accessed from either the cell phone user interface, digital camera user interface or through a web-client interface such as amazon.com and others. The synchronization aspect of the invention in general ensures the consumer's digital images are synchronized with an internet based processing service and a repository of images or internet destination.

Figure 2:
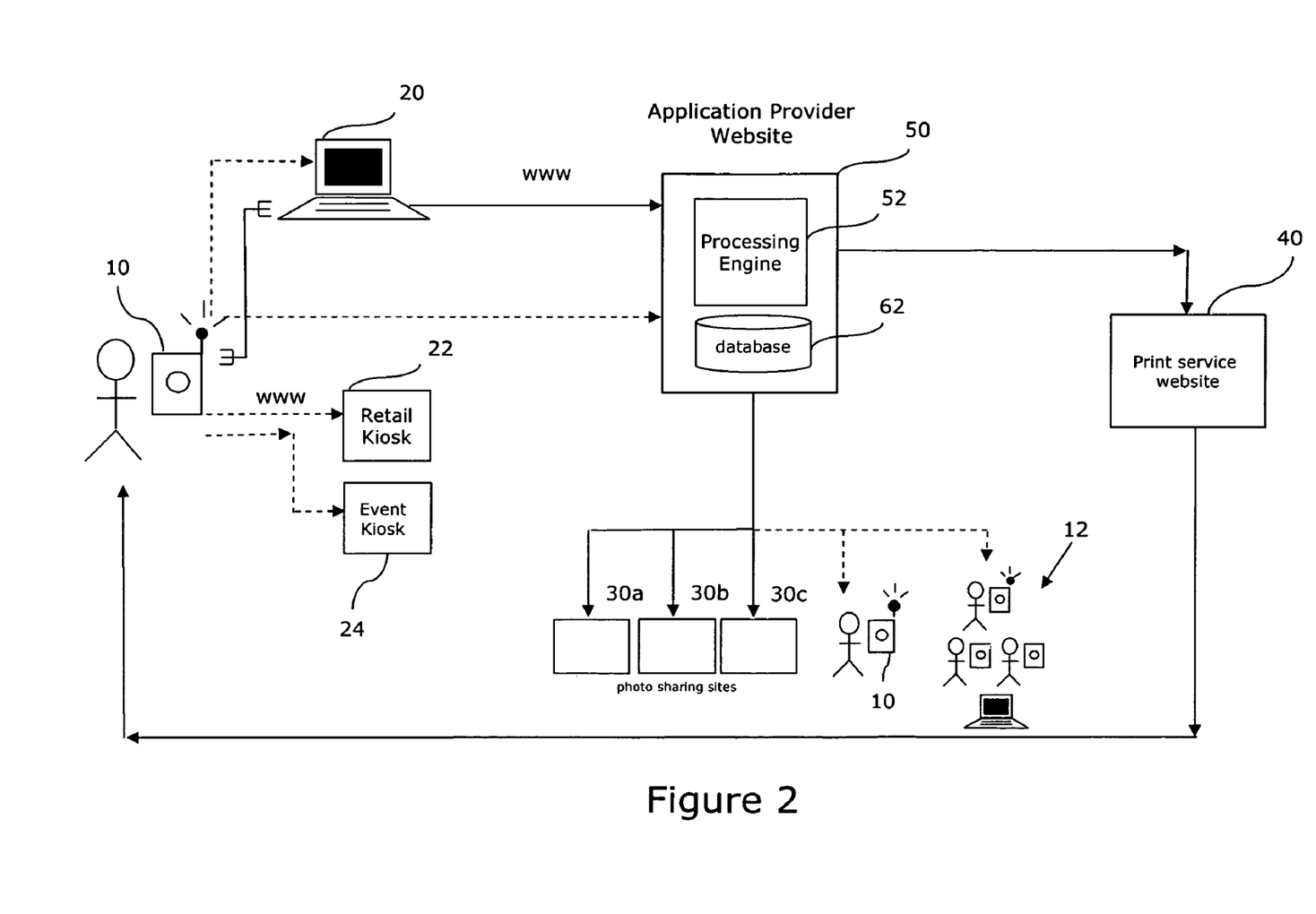
FIG. 2 is an overall view depicting various options for processing captured digital images according to the methods of this invention.

With reference to FIG. 2, a generic depiction of a consumer environment is depicted in which the consumer uses a digital device 10 to capture a digital image (e.g. cell phone camera, digital camera, smart device, digital video). At this point, the consumer has several options. He can download the captured image at a later time to a computer 20, which can then be used to send the captured image as part of an email through the World Wide Web to one of several destinations such as a print service provider where pictures may be ordered for printing, the prints later returned to the consumer by mail. Other options include downloading the captured images onto a storage device such as a RW CD or memory stick for later processing, or using the wireless capability of the smart device to send the stored image to a retail print station (kiosk) 22 such as one might find at a Target or Walgreen's store, for image printing, or to a location based event kiosk 24 (e.g. that one might find at an amusement park or a sports venue like a baseball stadium). Alternatively, the consumer can use the wireless capability of the smart device, either through an access point or portal or by computer 20 to transmit the captured image via the internet to Application Provider's image synchronization website 50, hosting process engine 52 of this invention.

With digital smart device 10, an image can be captured of an object (such as a flower, bridge, or building), a mobile event (such as a birthday party or sports competition) or a location defined event (such as a professional competition played at a sports stadium), the captured digital image stored in digital device 10. Though the most widely used protocol for representing photographic images is the Joint Professional Expert Group (JPEG) standard, the smart device may be otherwise formatted, such as for TIFF, RAW, etc. The JPEG standard (and others as well) has embedded within it metadata attributes (that is data about data) which describe the captured image, including data about the user, the device and device settings used to capture the image. Additionally, an end user can append additional attributes to the metadata file. It is these attributes, incorporated as part of the image file which are read and serve as the basis for further processing of the files.

The file transmitted from smart device using available file transport such as email, FTP, http, MMS, etc., is received at Application Provider's website 50 where it is routed to media process engine 52 The process engine 52 processes the inbound file by applying dynamic and/or preset parameters which are defined within a processing instruction file, such parameters defining the text, symbol or graphic to be placed within one of the areas of the media frame, where to send the media after compiling the frame, and the like.

Figure 3:
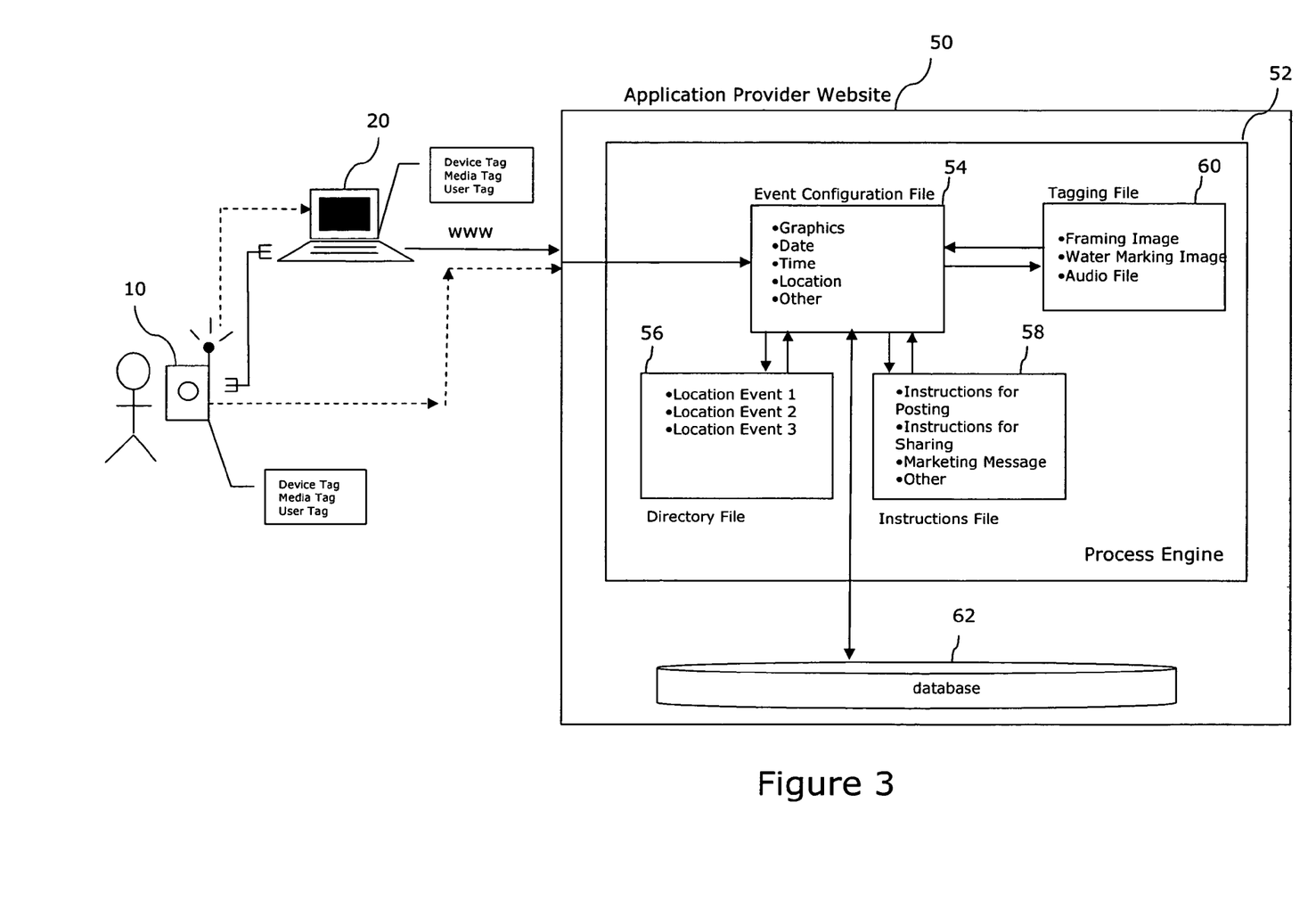
FIG. 3 is a depiction of the process engine of this invention.

With reference now to both FIG. 2 and FIG. 3, in one embodiment, for an image captured at a sports or entertainment venue, and transmitted from that venue, the transmitted file is metadata tagged with the event location according to the location of the local access point used to transmit the wireless signal. As received by process engine 52, the forwarded image is examined by event configuration file 54, and a search of directory file 56 made, based on the location, date and time metadata of the transmitted image to see if there is a match. If so, then the image is further processed according to the stored instructions contained within instructions file 58. In one embodiment, a tagging file 60 is accessed, and the captured image combined with the appropriate image and/or video resident from within tagging file 60. The instructions file 58 of event configuration file 54 also includes instructions for posting (such as "return framed image to sender"), instructions for viewing a marketing message which can be included with the posting of the captured image, instructions for appending an audio clip to the image, and the like. The packaged file including the original and appended digital image is then forward to event management database (EMS) 62 where it can be saved, and/or forwarded for posting and/or printing.

In one embodiment, where a database is maintained by a wireless internet service or other provider which references access points associated with said network, such references including event location data attributes, these same said attributes can be integrated within the EMS. These location event specific attributes are combined with the image file metadata when transmitting the primary digital image utilizing the wireless network to the application provider's website.

The instructions for image processing are determined by a user/consumer, event sponsor or the like. By way of illustration, a consumer can establish an account with the Application Provider's image synchronization website 50, and in the process of opening the account specify user preferences. Thus, a consumer user may direct that framed photos be returned immediately upon processing to the user's hand held device 10, or forwarded to database 62 for on-line storage, or forwarded for further processing such as printing by print service provider 40, or sending via wireless or email provider to a predetermined distribution list 12. In the case of a sponsored event, a call in number or email alias can be provided by the event sponsor, event attendees synchronizing their digital photo file to the process engine designated by the sponsor. Received by the process engine, the photo image can be joined with the frame and/or logo of the sponsoring event and returned, at the determination of the sponsor to the attendee user, and if desired to a sponsored web site, where some or all of the submitted images can be posted. Additionally, or alternatively, if the event is still in progress, such as at a baseball game, one or more of the images may be posted to any one of the sport screens resident at the stadium and real-time data may be incorporated into the frame or metadata tags.

The frame is designed to surround the image, and can include text and/or graphics. In one embodiment, the frame is added to the image using the same image standard as that used to represent the captured image. Thus, if the JPEG standard was used for the image, the added frame will likewise be based on the same JPEG standard. In another embodiment, the image file may be converted from one type to another, such as from RAW to JPEG, or vice versa, in order to more efficiently process the media.

Figure 4:
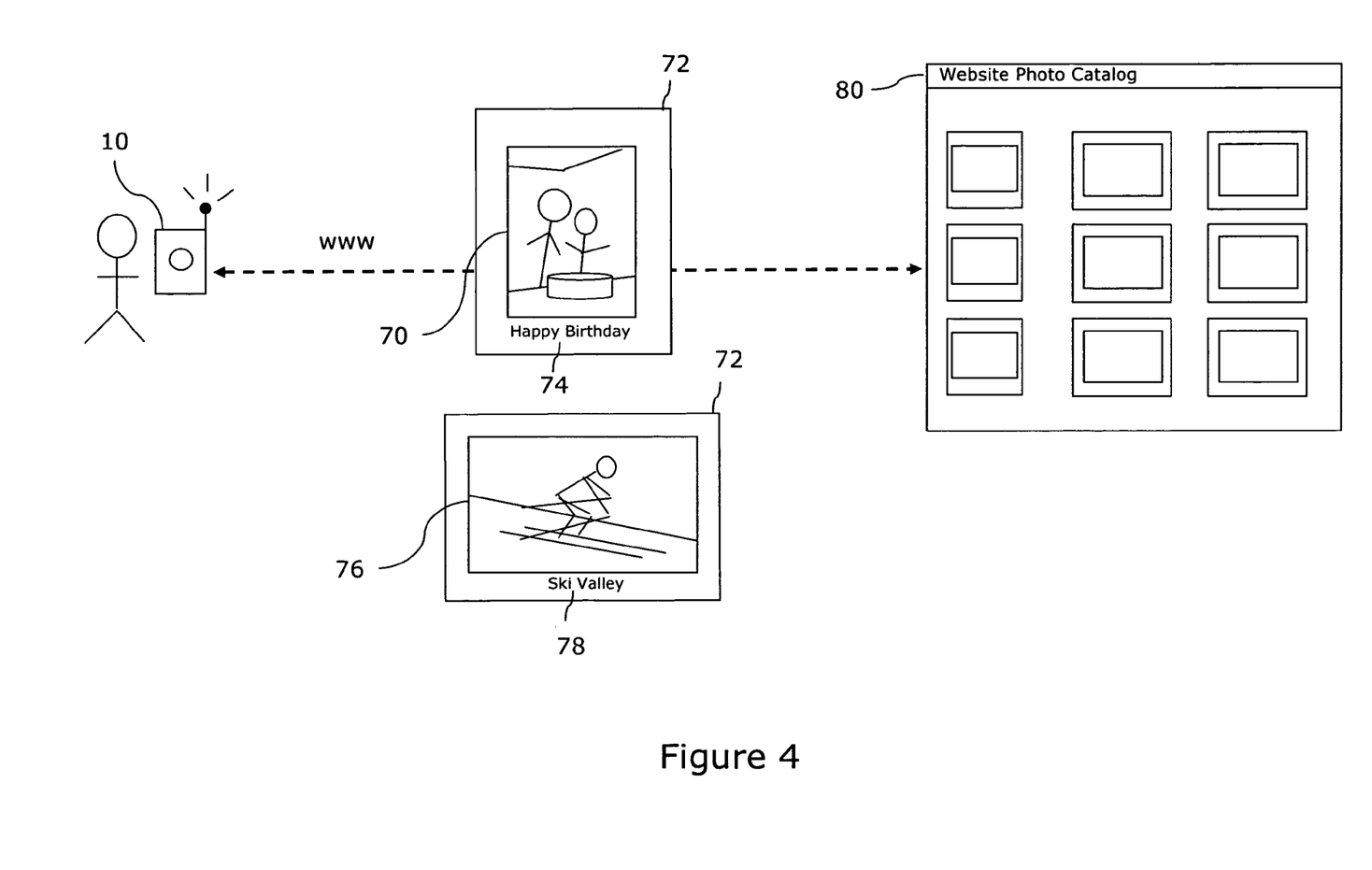
FIG. 4 illustrates a framed image and destination page according to an embodiment of the invention.

By way of further illustration of mobile event based tagging, a event based frame detail is shown in FIG. 4, in which a party scene 70 is depicted in one image, the photo surrounded by a frame 72 of a designated color, with a word description 74 of the event imprinted at the bottom of the frame. Again with reference to FIG. 4. an example of another event based image tag, a picture 76 of a skier is illustrated, frame 72 having embedded within it the name of the ski area, 78. Other types of tagging are possible at this stage, including overlay or watermarking of the image. The thus synchronized images may be returned via wireless to a consumer's smart device, stored as part of an photo catalogue 80 at database 62 of the Application Provider's website, posted to a one or more photo sharing websites (30a, 30b, 30c), or sent to others via distribution list 12.

Figure 5:
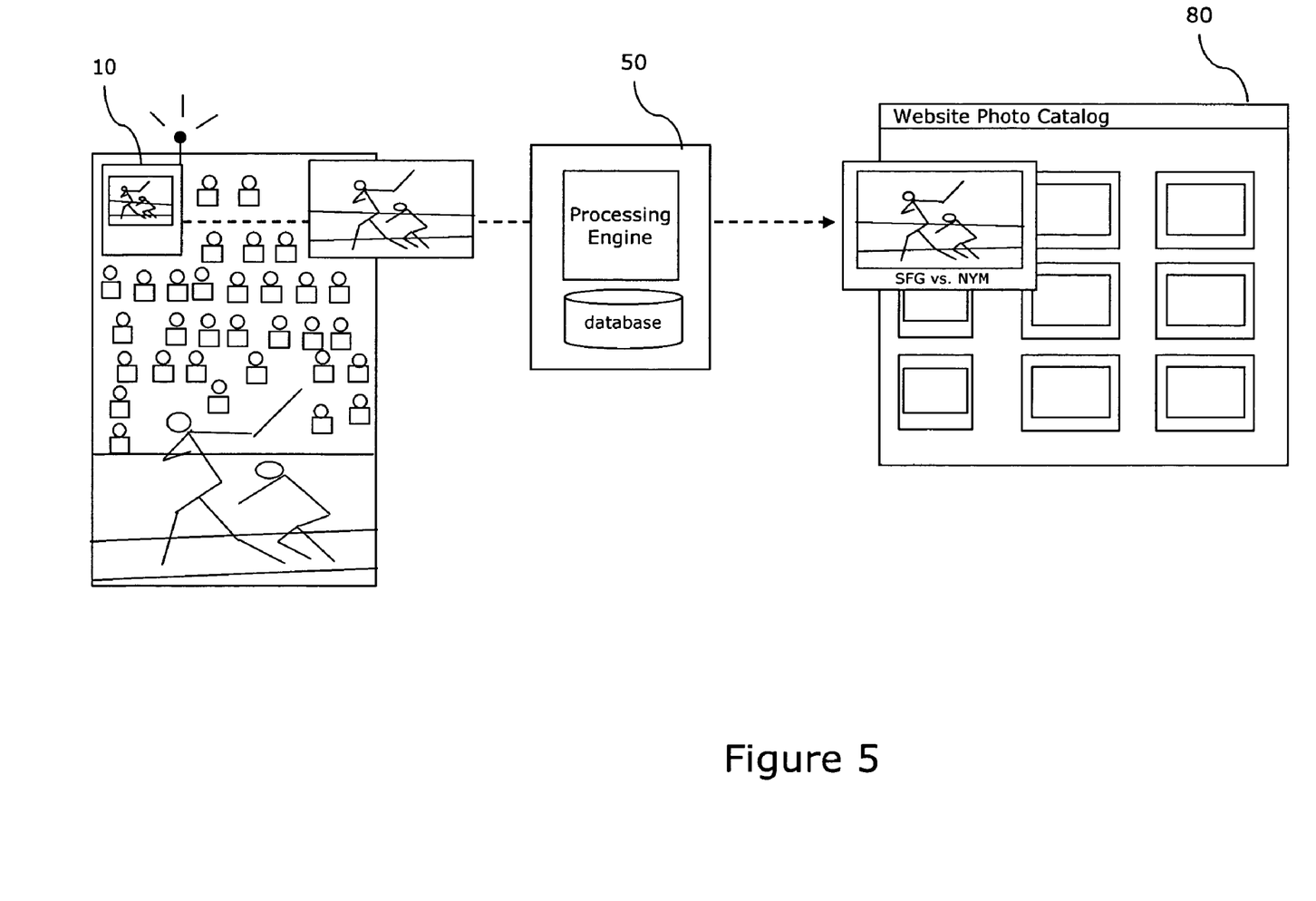
FIG. 5 illustrates the framing process of location-aware event based tagging.

Finally, exemplary of a sponsored location-aware event, a framed baseball game scene is illustrated in FIG. 5. In this embodiment, a user posts or uploads an image from the ballpark, the image file including event location specific tags which are gathered from the network, the device, and application provider database, this metadata providing the context for selection of location event specific advertisements or marketing messages. Upon receipt and analysis of the file by the process engine, the appropriate game day frame can be attached, labeling the picture with the date of the game and the names of the competing teams. Team logos can also be added as part of the frame. The picture is then posted per the instructions contained within instruction file 58. These files, further tagged with the host code, can include transactions which are to be performed based upon ad placements, and trigger the process engine to catalog and archive the transaction so as to ensure and comply with a sponsor's instructions.

Once an image has been framed by tagging file 60, it is packaged with the digital image and possibly other information, the combined image file sent back to the consumer' smart device 10 or PC 20. In addition, according to an embodiment of this invention, the thus framed image is forwarded to event management system database (EMS) 62. Database 62 is designed to handle the post processing of image options such as media storage and retrieval. At EMS 62, the thus framed image can be stored as a stand alone item, or be posted to an album or aggregated for public visibility. An email can also automatically be generated forwarding the single image or album to a photo processing provider 40 for fulfillment, such as printing of the images and forwarding to a consumer specified address.

In a still further embodiment of the invention, frames and the like can be downloaded from a provider website or venue directly to a smart device, and maintained resident in the device, much as ring tones, and wallpaper may be downloaded from providers of these features and stored. In this embodiment, the consumer can, by programming the smart device, turn the tagging feature "on" or "off". When in the "on" mode, pictures taken will be automatically framed and stored in the memory of the smart device. Further, more than one frame may be stored and the user may program the smart device so that the featured frame may be changed from picture to picture.

While the framing application of this invention has been described with respect to still mages, it is to be appreciated that this process can also be applied to video files and digital audio files. Thus, in an application of this invention, a frame can be placed around the presented image of a video clip. In another embodiment of this invention, an audio tone or tune can be appended to an image file, be it still or moving.

Other commercial applications of this invention will now be discussed. In one such application, synchronized files may be sent directly to a location based entertainment kiosk 24 (see FIG. 2), such as of the type displayed in my U.S. Design Pat. D410481 for either immediate output or synchronizing with an applications provider destination. This type of kiosk is typically found at venues such as a sports stadium or at an amusement park. Here, the consumer can wirelessly transmit images from any compatible digital input device to the kiosk via a specific url, code, alias or telephone number. In the case where immediate output is desired, the consumer synchronizes directly with kiosk. The synchronization process with an internet destination can be set up as a sub-process of the primary output process. A kiosk 22 may also be part of an on-site retail location such as a Target, Walgreen's, or like type of store.

Specific to the kiosk, a marketer at or for the location can promote the use of kiosk and synchronization service through several marketing tactics. As an example, the kiosk can be co-branded by both the imaging service provider and the telecommunication service provider. Also, entry tickets (or tokens) to a given location could include incentives to utilize the kiosk imaging service, and kiosks can be positioned strategically to take advantage of traffic patterns. End products (digital photographs) can also contain location themed text or graphics. e.g. 2008 Winter Olympics. Each of these co-branding tactics can support affiliate revenue streams for all sponsors involved.

In still another application of this invention, one can synchronize files from a virtual location such as with massively multiplayer online games (MMOGs) where avatars or similar proxies are used. Today, images of one's avatars or proxies (personality images available for websites where individuals create identities to represent themselves in place of using images that have a true likeness) can only be captured from the computer display screen through a manual screen capture process. Screen capture is a keyboard command which copies all the contents of a computer display for inclusion within a compatible file format such as .doc or .ppt, etc. The present invention further enables participants within these virtual environments to engage virtual photography kiosks, and have their proxy images captured. These images can then be synchronized with an internet destination or repository. For example, many game players have been known to meet, date, and marry, staging in-game weddings. This invention can provide a virtual photography service and the synchronization of these "wedding pictures" with a real-world imaging service company or internet destination. The end result is virtual world wedding pictures or theme framed photos from these virtual reality environments. These frames can contain brand names specific to brand sponsored events within this virtual reality. That is, photos taken at a product launch would be branded with the brand sponsors graphic. This frame would persist outside of the virtual world and across the internet.

Like other processes described above, these virtual images can be synchronized and associated to an existing or new account. Unlike the other business methods referenced above, however, here a commerce relationship is established between a virtual world environment and a physical world imaging service. Similar to the other examples, an affiliate revenue model can generate revenue for the virtual environment as well as provide another channel for imaging service providers to obtain new customers: e.g., all users of this service from within the virtual environment can access a given service provider for their physical products or services. Each of these transactions can result in the aggregation of points or rewards for the individual and the virtual community brand. The result is an aggregated buying power for the virtual community brand and loyalty points or similar for the consumer. The management of this point and reward system is enabled by the process engine, which can capture and publish the details of all transactions in order to deliver value to the end user of the system.

Several known technologies can be implemented to ensure the most efficient processing of images during the synchronization process. When synchronizing with a location-based kiosk, the images use a file packaging process, which ensure the complete file is synchronized with the kiosk even in the case of a disrupted transmission. Once these files are synchronized with the kiosk and processed, the files can be cached for near real-time synchronization with the hosting service (portal) or internet image repository. Both of these technologies are widely used in the marketplace today. As an example, many email applications use a store and forward process to support remote email access. Packaging the email file by packet size allows the system to monitor the state of transmission. Advances in these algorithms and paradigms are certain to evolve and these forthcoming technology standards will be utilized to upgrade the synchronization process while retaining the logical process flows necessary to ensure favorable consumer user experiences and transactions.

Incorporated within event configuration file 54 are sub-processes such as the marketing and promotional tactics associated with selling services to a given account owner as well as the processing or delivery of any consumed service. Once the images are synchronized to a given account, a business can market and promote complimentary products and services relative to specific synchronized transactions. These marketing or promotional messages, which can be delivered via email, mms, sms or other transport, serve to compliment the image processing process and in turn can result in additional consumer purchases. The system can initiate the processing or delivery of product or services through these sub-processes (e.g. synch and email sub-processes), can synch the images with the account, and then email one or all of the synchronized images to a specified recipient.

When synchronizing with a retail location such a kiosk, a similar process is followed. The consumer can choose to use a known method for connecting via physical device or utilize wireless telecommunications via dialed number for the synchronization of his or her images. This capability enables the consumer to synchronize images while shopping at the referenced retail location. Although these locations will generally cater to one-on-one personal service, a consumer who desires can have their images synchronized with their internet image repository. When synchronizing directly through the internet from either the device or virtual space such as Linden Labs, Second Life or MySpace, or other Virtual Communities, a user can directly access a predefined mobile URL By way of illustrating another commercial branding application of the invention, an image captured at a ballpark during a game could be uploaded for inclusion into a brand sponsored community photo album. This album can include all images captured by wireless devices and uploaded to the internet destination during the game. Manipulating the image to include the agreed to branding and graphics is an example of how the media process engine operates. In addition, it is the role of the process engine to communicate with the database to enforce the rules and policies relative to the sponsored event. It is the role of the process engine to not only post the final image within the appropriate account of the consumer or create a temporary account for a new consumer, but to trigger the outbound communication back to the consumer confirming the receipt and processing of the image. During this bi-directional communication the process server ensures the systematically created and captured metadata is used to key or initiate the advertising and promotional processes for a given user.

In one embodiment, for someone without a pre-existing account who sends a digital image to a sponsored address, the process engine can be programmed to automatically process and store the image according to preferences of the sponsor. In another embodiment, the process engine can further create a temporary account for the user, and assign a user password, thus allowing the user to later set up their own permanent account.

While the foregoing is directed to embodiments of the present invention, other and further embodiments of the invention may be devised without departing from the basic scope thereof, and the scope thereof is determined by the claims that follow.

What I claim is:

1. A method for creating, transmitting, modifying and posting a digital image file including the steps of:
    digitally capturing a photographed image using a hand held digital device;
    creating a first digital photographic image file of the captured image;
    wirelessly transmitting the captured digital photographic image file from said hand held digital device to an interne based application web service which hosts a process engine for synchronizing said digital photographic image file with a second digital file; the transmitted photographic digital image file including an associated alias, and one or more of the following metadata attributes selected from the group comprising the date, time, place of image file creation, the device and device settings used to take the image, the network access point, and the identity of the image taker;
    selecting from within a menu of instructions stored within said process engine which of said stored instructions are to be applied to the further processing of the captured photographic digital image file, said selection performed by said process engine based upon the transmitted alias and the at least one of the metadata attributes associated with the said alias;
    appending to the first digital photograph image file a second digital graphics file, said second digital graphics file including a digital frame which is configured to surround the captured first digital photographic image file to create a combined file, wherein all such image synchronization occurs remote from said hand held digital device; and thereafter,
    wirelessly transmitting the combined photographic image file to a wireless device.

2. The method of claim 1 wherein the captured first digital photographic image file comprises a digital still image.

3. The method of claim 1 wherein the captured first digital photographic image file comprises a digital video image.

4. The method of claim 1 wherein the digital frame includes media selected from text and graphics disposed therewithin.

5. The method of claim 1 wherein the second digital file includes a digital image which creates a text or graphic overlay onto the captured first digital photographic image file.

6. The method of claim 1 wherein the second digital file is combined with an audio file.

7. The method of claim 1 wherein the second digital file is combined with an appended marketing message.

8. The method of claim 1 in which an event configuration file within the process engine reads the alias, and based upon the alias and/or one or more of the metadata attributes associated with said alias selects from within a menu of stored instructions which of said stored instructions are to be applied to the further processing of the captured photographic digital image file.

9. The method of claim 8 wherein the stored instructions include instructions for wirelessly transmitting the combined image files back to the sender of the photographic image file.

10. The method of claim 8 wherein the stored instructions include instructions for wirelessly transmitting the combined files to a destination other than the destination of the first photographic image file sender.

11. The method of claim 1 further including the step of storing the combined first digital photographic image file and second digital graphics file in an online media depository.

12. A process engine for synchronizing a captured digital photographic image received from a wireless mobile device with stored media files, including:
    an event configuration file which receives said forwarded digital image, and reads its associated metadata;
    a directory file in communication with said event configuration file which directory file contains sponsored location event based instructions for image processing;
    an instructions file in communication with said event configuration file which instructions file includes among other things instructions for post processing of the forwarded digital photographic image file, and instructions for immediately returning the processed image file to the wireless mobile device which sent the image file, the forwarding of the processed image file to a database for on-line storage, forwarding the processed image file to print service provider, or forwarding the processed image file to other mobile devices via wireless or by email provider to a predetermined distribution list; and, a tagging file in communication with the event configuration file, which tagging file includes a digital graphics file defining a frame to surround said photographic image, audio files and metadata to be synchronized with said captured digital photographic image file;

whereby, as received by the process engine, a wirelessly sent photographic image file along with its associated alias and metadata attributes is examined by the event configuration file and associated directory and instructions files, the tagging file accessed for retrieval of said digital graphics file for synchronization with said photographic image file, and additional processing performed according to instructions contained within said event configuration, directory and instructions files.

13. The process engine of claim 12 further including an event management system database for storage of said synchronized digital images.

* * * * *